(12) United States Patent
Huang et al.

(10) Patent No.: US 12,201,915 B1
(45) Date of Patent: Jan. 21, 2025

(54) CONNECTOR FOR A TOY FIGURE

(71) Applicant: Mattel, Inc., El Segundo, CA (US)

(72) Inventors: Shixiong Huang, Shenzhen (CN); Wei Li, Huizhou (CN); YunZhong Li, FoShan (CN); Qiu Ya Xiao, Shenzhen (CN); Peng Zhou, Shenzhen (CN)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 18/641,489

(22) Filed: Apr. 22, 2024

(51) Int. Cl.
*A63H 3/16* (2006.01)
*A63H 3/46* (2006.01)
*F16B 7/04* (2006.01)

(52) U.S. Cl.
CPC ............. *A63H 3/16* (2013.01); *A63H 3/46* (2013.01); *F16B 7/0413* (2013.01)

(58) Field of Classification Search
CPC ........... A63H 3/46; A63H 3/16; F16B 7/0413; F16B 2012/403
See application file for complete search history.

(56) References Cited

U.S. PATENT DOCUMENTS

| 242,210 | A | * | 5/1881 | Mason et al. | A63H 3/46 446/384 |
| 1,566,801 | A | * | 12/1925 | Millard | A63H 3/12 446/376 |
| 2,756,540 | A | * | 7/1956 | Cleaver | A63H 3/46 446/391 |
| 3,345,095 | A | * | 10/1967 | Hohenberger | F16B 7/0413 52/848 |
| 3,699,715 | A | | 10/1972 | Lewis et al. | |
| 3,740,894 | A | | 6/1973 | Howland et al. | |
| 3,818,631 | A | | 6/1974 | Cederholm | |
| 3,866,350 | A | | 2/1975 | Goldfarb et al. | |
| 3,955,309 | A | | 5/1976 | Noble | |
| 3,988,855 | A | | 11/1976 | Crabtree et al. | |
| 4,068,346 | A | * | 1/1978 | Binder | B25G 1/04 15/159.1 |
| 4,136,483 | A | | 1/1979 | Shackelford et al. | |
| 4,236,347 | A | | 12/1980 | Fauls | |
| 4,274,224 | A | | 6/1981 | Pugh | |
| 4,359,960 | A | * | 11/1982 | Burchett | E21B 41/10 114/294 |
| 4,526,553 | A | | 7/1985 | Guerreo | |
| 4,657,518 | A | | 4/1987 | Kelly et al. | |

(Continued)

FOREIGN PATENT DOCUMENTS

| CN | 1113678 C | 7/2003 |
| CN | 101889812 B | 11/2010 |

(Continued)

*Primary Examiner* — John A Ricci

(74) *Attorney, Agent, or Firm* — Edell, Shapiro & Finnan, LLC

(57) ABSTRACT

A toy figure is presented herein with a connector for coupling two parts of the toy figure together. The connector has a first connector portion, a second connector portion, and an intermediate connector portion located between and coupled to both the first connector portion and the second connector portion. The intermediate connector portion has two spaced apart middle portions that define a channel therebetween and which can move toward and away from each other. The first connector portion has two side portions that can also move toward and away from each other.

19 Claims, 11 Drawing Sheets

(56) References Cited

U.S. PATENT DOCUMENTS

| | | | |
|---|---|---|---|
| 4,657,519 A | | 4/1987 | Kobayashi |
| 4,854,911 A | | 8/1989 | Berliner et al. |
| 4,968,282 A | | 11/1990 | Robson et al. |
| 5,261,756 A | * | 11/1993 | Kohn .................... F16B 7/0413 |
| | | | 403/292 |
| 5,334,073 A | | 8/1994 | Tilbor et al. |
| 5,642,957 A | * | 7/1997 | Lange .................... F16B 7/0413 |
| | | | 403/292 |
| 5,713,779 A | | 2/1998 | Chen |
| 5,722,124 A | * | 3/1998 | Wisniewski ......... F16B 21/086 |
| | | | 24/295 |
| 5,803,787 A | | 9/1998 | Kulchyski |
| 5,862,024 A | * | 1/1999 | Watanabe .......... G11B 23/0316 |
| 5,894,635 A | * | 4/1999 | Lu ........................ G06F 1/1681 |
| | | | 16/386 |
| 6,086,447 A | | 7/2000 | Tucker |
| 6,220,922 B1 | | 4/2001 | Lee et al. |
| 6,422,916 B1 | | 7/2002 | Enku |
| 6,537,131 B1 | | 3/2003 | Larian |
| 6,685,533 B1 | | 2/2004 | Lee |
| 6,840,702 B2 | * | 1/2005 | Ko .......................... F16B 12/36 |
| | | | 403/294 |
| 6,887,120 B2 | | 5/2005 | Shamitoff |
| 7,186,050 B2 | * | 3/2007 | Dean .................... F16B 7/0413 |
| | | | 403/379.6 |
| 7,326,100 B2 | | 2/2008 | O'Brien |
| 7,575,496 B2 | | 8/2009 | Lau et al. |
| 7,681,843 B2 | * | 3/2010 | McQueeny ........... A47F 5/0884 |
| | | | 248/222.12 |
| 8,382,551 B2 | | 2/2013 | Hong |
| 8,651,914 B2 | | 2/2014 | Sisamos |
| 9,067,147 B1 | | 6/2015 | Woodhouse |
| 9,873,059 B1 | | 1/2018 | Sutton |
| 10,072,425 B1 | * | 9/2018 | Madden .............. E04F 11/1836 |
| 11,241,634 B2 | | 2/2022 | Lawber |
| 11,524,246 B2 | | 12/2022 | Mayer et al. |
| 11,602,698 B2 | | 3/2023 | Skripps |
| 2002/0002022 A1 | | 1/2002 | Wilcox et al. |
| 2002/0131819 A1 | * | 9/2002 | Kress ....................... B23C 5/10 |
| | | | 403/292 |
| 2005/0191936 A1 | | 9/2005 | Marine et al. |
| 2008/0057826 A1 | | 3/2008 | Todokoro |
| 2012/0208428 A1 | | 8/2012 | Zheng |
| 2015/0375127 A1 | | 12/2015 | Fukuchi |
| 2017/0209801 A1 | | 7/2017 | Sisamos |
| 2022/0111301 A1 | | 4/2022 | Atwood, III |
| 2023/0390658 A1 | | 12/2023 | Hsu |
| 2023/0390659 A1 | | 12/2023 | Hsu |

FOREIGN PATENT DOCUMENTS

| | | |
|---|---|---|
| CN | 104998423 B | 10/2015 |
| CN | 105561588 B | 5/2016 |
| CN | 105597340 B | 5/2016 |
| EP | 1200164 B1 | 5/2002 |
| EP | 1539315 B1 | 6/2005 |
| WO | 2022099817 A1 | 5/2022 |
| WO | 2023003885 A1 | 1/2023 |
| WO | 2023272925 A1 | 1/2023 |

\* cited by examiner

CONNECTOR FOR A TOY FIGURE

TECHNICAL FIELD

The present application relates generally to a toy figure and, in particular, to a connector that is used with a toy figure to couple different parts of the toy figure together.

BACKGROUND

Toys provide entertainment for different users, such as children. For example, a toy may include various features with which a child may play. An example toy that may entertain a child is a toy figure, such as a doll. In some conventional toy figures, a coupler is used to connect parts of the toy figure together. Such couplers are difficult to use and require a high force to be applied to separate the parts of the toy figure from each other. As a result, it is difficult for a child to overcome the coupler when wanting to separate the toy figure parts while playing with the toy figure.

Thus, there is a need for a connector for a toy figure that is easy to use, and that facilitates easy separating of toy figure parts, such as a doll head from a doll body, when desired.

SUMMARY

A toy figure is presented herein with a connector for coupling two parts of the toy figure together. The connector has a first connector portion, a second connector portion, and an intermediate connector portion located between and coupled to both the first connector portion and the second connector portion. The intermediate connector portion has two spaced apart middle portions that define a channel therebetween and which can move toward and away from each other. The first connector portion has two side portions that can also move toward and away from each other.

In one aspect of the disclosure, a toy figure comprises a first body component defining a first cavity and a first hole, a second body component defining a second cavity and a second hole; and a connector that couples the first body component to the second body component, the connector including a first connector portion engageable with the first body component and insertable into the first hole and first cavity, the first connector portion defining a first opening therethrough, a second connector portion engageable with the second body component and insertable into the second hole and second cavity, the second connector portion defining a second opening therethrough, and an intermediate connector portion located between and coupled to the first connector portion and the second connector portion, the intermediate connector portion including a first middle portion and a second middle portion that define a channel therebetween, the channel being in communication with the first opening and the second opening, wherein the first middle portion and the second middle portion are movable toward and away from each other.

In one embodiment, the first connector portion includes a first side portion with a first outer surface and a second side portion with a second outer surface, and the first opening is located between the first side portion and the second side portion.

In another embodiment, the first outer surface has a first projection extending therefrom, and the first projection engages the first body component when the first connector portion is inserted into the first cavity.

In another embodiment, the second outer surface has a second projection extending therefrom in a direction opposite the first projection, and the second projection engages the first body component when the first connector portion is inserted into the first cavity.

In yet another embodiment, the first hole has a diameter that is a first distance, the first outer surface and the second outer surface are separated by a second distance, the second distance being greater than the first distance, and forces are applied to the first side portion and to the second side portion as the first connector portion is inserted into the first hole.

In an alternative embodiment, the forces cause the first side portion and the second side portion to move toward each other, and cause the first middle portion and the second middle portion to move toward each other.

In another embodiment, the first middle portion and the second middle portion move toward each other, and a width of the channel decreases.

In yet another embodiment, the first body component includes an internal projection that extends into the first cavity and defines in part the first hole, and the internal projection includes a ridge extending inwardly therefrom.

In another embodiment, the ridge applies the forces on the first side portion and the second side portion as the first side portion and the second side portion engage the ridge.

In an alternative embodiment, when the first connector portion moves past the ridge and into the first cavity, the first side portion and the second side portion move away from each other, and the first middle portion and the second middle portion move away from each other.

In another embodiment, the first connector portion has a first loop configuration defining the first opening, the second connector portion has a second loop configuration defining the second opening, and the first loop configuration is larger than the second loop configuration.

In another aspect of the disclosure, a toy figure comprises a first body component having a cavity, a second body component, and a connector that couples the first body component to the second body component, the connector including a first connector portion that engages the first body component, the first connector portion having a first side portion and a second side portion, the first side portion and second side portion being movable toward and away from each other, a second connector portion that engages with the second body component, and an intermediate connector portion coupled to the first connector portion and the second connector portion, the intermediate connector portion including a first middle portion and a second middle portion spaced apart from the first middle portion, wherein the first middle portion and the second middle portion are movable toward each other as the first connector portion is inserted into the cavity and movable away from each other when the first connector portion is located in the cavity.

In another embodiment, the first side portion has a first outer surface with a first projection extending therefrom, the second side portion has a second outer surface with a second projection extending therefrom, and each of the first projection and the second projection engages the first body component when the first connector portion is inserted into the cavity.

In yet another embodiment, the first body component applies forces to both the first side portion and the second side portion as the first connector portion is inserted into the cavity, and the forces cause the first middle portion and the second middle portion to move toward each other.

In an alternative embodiment, the first body component includes an internal projection that extends into the cavity and defines a hole, the internal projection includes a ridge, the ridge applies the forces on the first side portion and the second side portion as the first side portion and the second side portion engage the ridge, and the first middle portion and the second middle portion move away from each other after the first side portion and the second side portion move past the ridge and into the cavity.

In another aspect of the disclosure, a toy figure comprises a first body component having a cavity, a second body component, and a connector that couples the first body component to the second body component, the connector including a first connector portion that engages the first body component, the first connector portion having a first side portion and a second side portion, each of the first side portion and second side portion is movable toward each other from a first unbiased position to a first biased position as the first connector portion is inserted into the cavity, a second connector portion that engages with the second body component, and an intermediate connector portion coupled to the first connector portion and the second connector portion, the intermediate connector portion including a first middle portion and a second middle portion spaced apart from the first middle portion, wherein each of the first middle portion and the second middle portion is movable toward each other from a second unbiased position to a second biased position as the first connector portion is inserted into the cavity.

In an alternative embodiment, the first side portion and the second side portion move away from each other from their first biased positions to their first unbiased positions after the first connector portion has been inserted into the cavity.

In another embodiment, the first middle portion and the second middle portion move away from each other from their second biased positions to their second unbiased positions after the first connector portion has been inserted into the cavity.

In yet another embodiment, the first side portion has a first outer surface with a first projection extending therefrom, the second side portion has a second outer surface with a second projection extending therefrom, and each of the first projection and the second projection engages the first body component when the first connector portion is located in the cavity.

In another embodiment, the first body component applies forces to both the first side portion and the second side portion as the first connector portion is inserted into the cavity, and the forces cause the first middle portion and the second middle portion to move toward each other.

BRIEF DESCRIPTION OF THE DRAWINGS

The toy figure presented herein may be better understood with reference to the following drawings and description. Unless dimensions of elements of the drawings are specifically called-out and described herein, it should be understood that the elements in the figures are not necessarily to scale and that emphasis has been placed upon illustrating the principles of the toy figure. In the figures, like-referenced numerals designate corresponding parts throughout the different views.

DETAILED DESCRIPTION

A toy figure is disclosed herein. A toy figure has a connector for coupling two parts of the toy figure together. The connector has a first connector portion, a second connector portion, and an intermediate connector portion located between and coupled to both the first connector portion and the second connector portion. The intermediate connector portion has two spaced apart middle portions that define a channel therebetween and which can move toward and away from each other. The first connector portion has two side portions that can also move toward and away from each other. The connector has general spring-like characteristics in that portions of the connector can move from unbiased positions to biased positions in response to the application of an external force to the connector.

In accordance with this disclosure, the connector allows doll heads to be easily connected to and removed from the body. The connector makes it quicker to securely assemble heads to bodies during the manufacturing process. In addition, the connector lets users easily switch and customize their dolls with different heads. The connector has a flexible open bulb or mushroom-shaped portion that can be slightly deformed for easy insertion into the cavity of a doll head. In addition, there are two small ribs or ridges on the sides of the connector that provide tactile feedback when the connector is properly engaged with the doll head.

Figure 1:
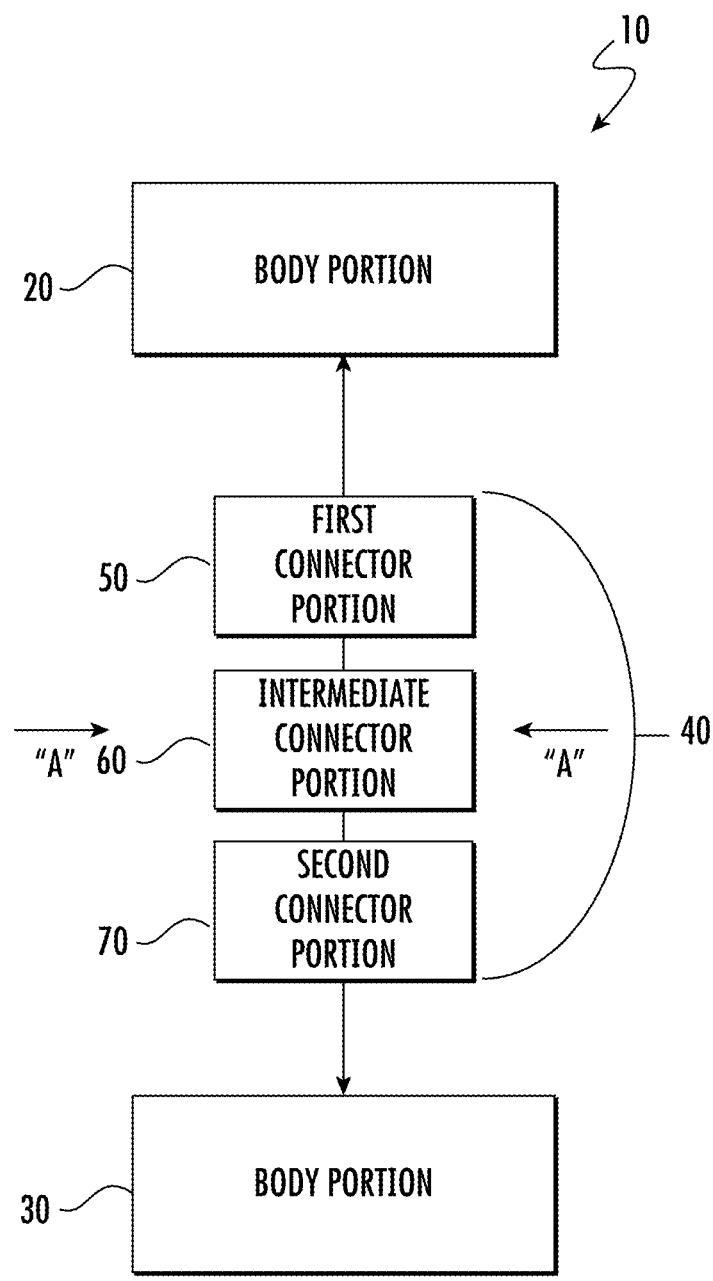
FIG. 1 illustrates a schematic diagram of an example embodiment of a toy figure in accordance with the aspects disclosed herein.
Figure 10:
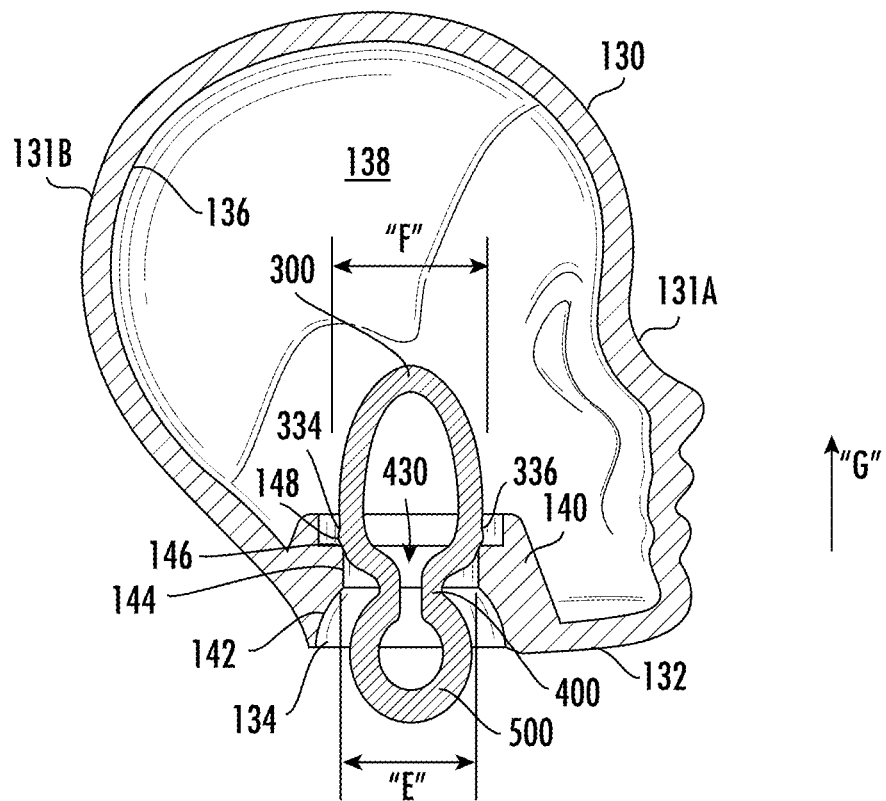
FIG. 10 illustrates a cross-sectional side view of a body component showing the connector illustrated in FIG. 5 inserted thereinto.

Turning initially to FIG. 1, a schematic diagram of an example embodiment of a toy figure in accordance with the aspects disclosed herein is illustrated. In this embodiment, the toy FIG. 10 is a doll, figure, or other character that has a first body portion 20 and a second body portion 30. The body portions can be referred to alternatively as body components. The first body portion 20 is coupled to the second body portion 30 by a connector 40. The connector 40 is configured to engage both the first body portion 20 and the second body portion 30.

In one embodiment, the connector 40 includes a first connector portion 50, an intermediate connector portion 60, and a second connector portion 70. The intermediate connector portion 60 is located between the first connector portion 50 and the second connector portion 70, and is coupled to both the first connector portion 50 and the second connector portion 70. In one implementation, the intermediate connector portion 60 is integrally formed with the first connector portion 50 and the second connector portion 70. In another implementation, the intermediate connector portion 60 can be formed separately from the first connector portion 50 and the second connector portion 70 and be subsequently coupled thereto. In one embodiment, the connector 40 can be orientated such that the first connector portion 50 is an upper connector portion, and the second connector portion 70 is a lower connector portion.

In one embodiment, the first connector portion 50 is insertable into body portion 20, and the second connector portion 70 is insertable into body portion 30. Body portion 20 has a hole into which first connector portion 50 can be inserted and a cavity in which the first connector portion 50 can be located. The hole has a diameter that is less than the width of the first connector portion 50. As a result, once first connector portion 50 is inserted into the cavity of body portion 20, the width of the first connector portion 50 is larger than the hole diameter, which retains the first connector portion 50 in the cavity until a sufficient force is applied to pull the first connector portion 50 away from body portion 20. As the first connector portion 50 is inserted into body portion 20, the body portion 20 applies forces on the first connector portion 50 along the directions of arrows "A" in FIG. 1. The applied forces cause the first connector portion 50 to move from an unbiased configuration to a smaller or narrower biased configuration. In addition, the intermediate connector portion 60 moves from an unbiased configuration to a smaller or narrower biased configuration. Once the forces are no longer applied, both the first connector portion 50 and the intermediate connector portion 60 return to their unbiased configurations. Similarly, body portion 30 has a hole into which second connector portion 70 can be inserted and a cavity in which the second connector portion 70 can be located.

Figure 2:
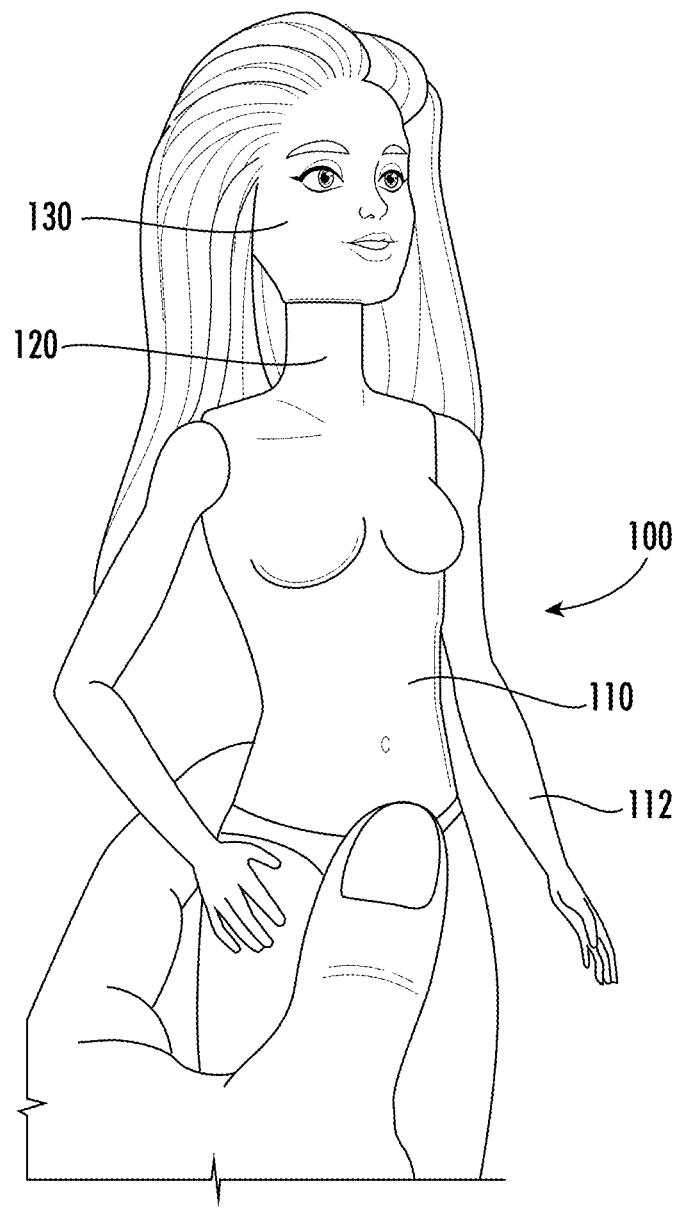
FIG. 2 illustrates a perspective view of an embodiment of a toy figure in accordance with the aspects disclosed herein.

Referring to FIG. 2, a perspective view of an embodiment of a toy figure in accordance with the aspects disclosed herein is illustrated. In this embodiment, the toy FIG. 100 includes a body portion 110, which can be referred to alternatively as a body component, appendages 112, and a neck or neck portion 120. Another body component 130, which in this embodiment is a head for the toy figure, can be mounted to the neck 120.

Figure 3:
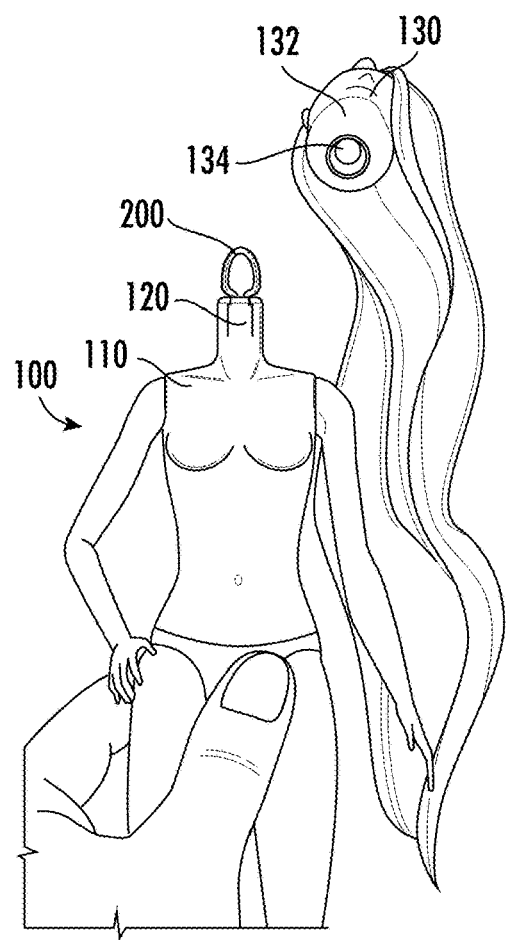
FIG. 3 illustrates a front view of the toy figure illustrated in FIG. 2 with a body component removed.
Figure 4:
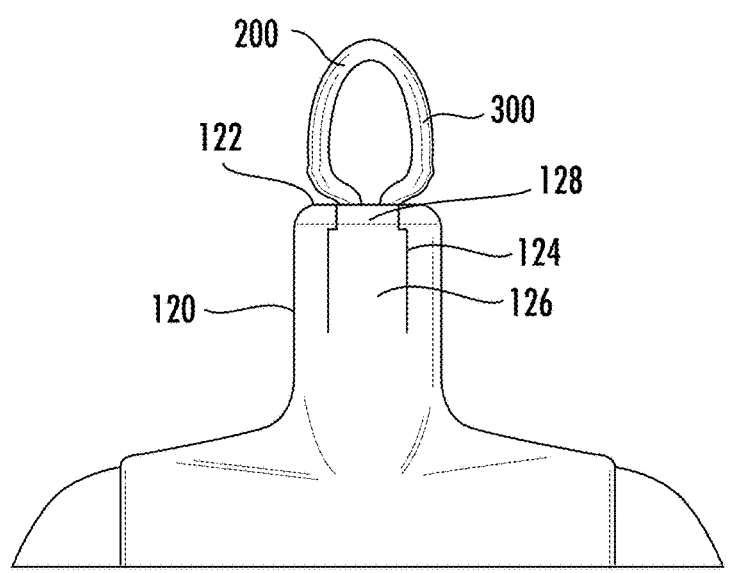
FIG. 4 illustrates a close-up front view of a neck portion of the toy figure illustrated in FIG. 2.

Turning to FIGS. 3 and 4, the body component 130 has been removed from the neck 120 of the toy FIG. 100. The body component 130, or toy figure head, has a lower surface 132 in which a mounting hole 134 is located. An embodiment of a connector 200 is shown extending upward from the neck 120. In the view shown in FIG. 3, the connector 200 has another portion that is located in the neck 120 of the toy FIG. 100.

In FIG. 4, a first connector portion 300 of the connector 200 is illustrated in greater detail. In this orientation and embodiment, the first connector portion 300 can be referred to alternatively as an upper connector portion. The connector 200 includes another connector portion (not shown in FIG. 4), that is located in neck 120. Several features of the neck 120 are illustrated in FIG. 4 as well. In particular, the neck 120 has a hole 128 located in end 122, which is in communication with a cavity or receptacle 126 in neck 120 that is defined by an inner surface 124.

Figure 5:
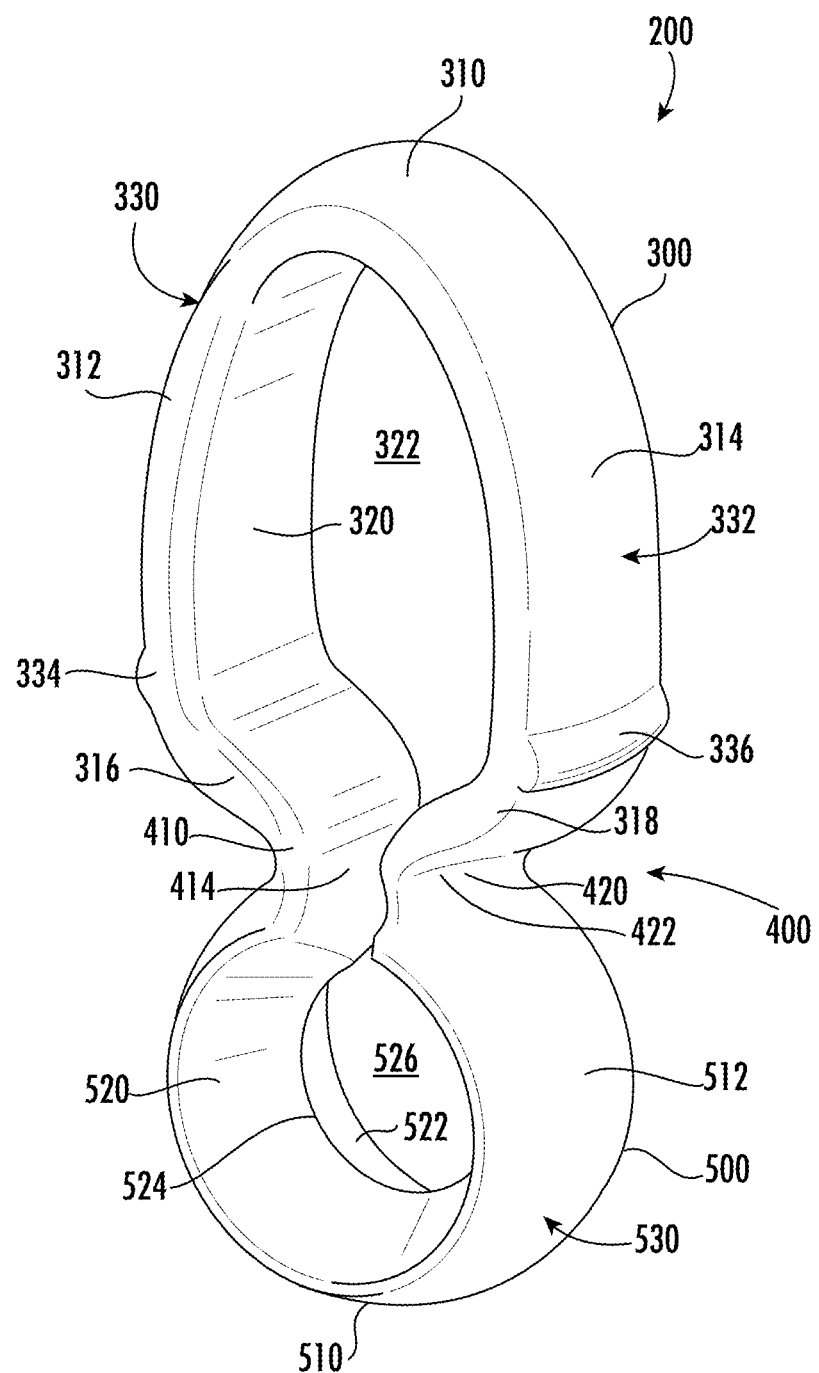
FIG. 5 illustrates a perspective view of an embodiment of a connector in accordance with the aspects disclosed herein.
Figure 6:
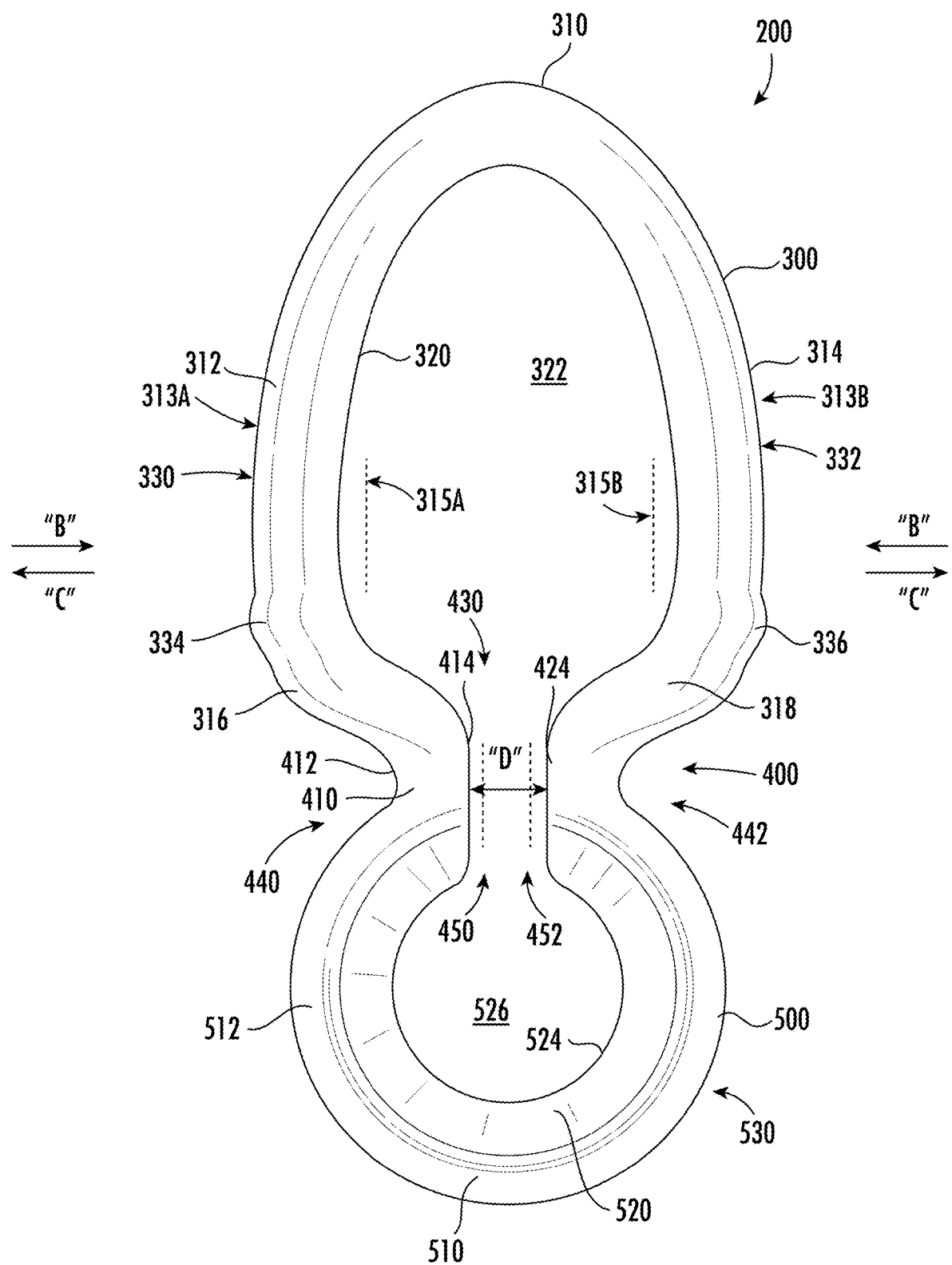
FIG. 6 illustrates a front view of the connector illustrated in FIG. 5.

Turning to FIGS. 5 and 6, an embodiment of a connector in accordance with the aspects disclosed herein is illustrated. In this embodiment, the connector 200 has a first connector portion 300, an intermediate connector portion 400, and a second connector portion 500. In one orientation, the first connector portion 300 is an upper connector portion, and the second connector portion 500 is a lower connector portion. In an alternative orientation, the first connector portion 300 is a lower connector portion, and the second connector portion 500 is an upper connector portion.

First connector portion 300 has a first end 310 with side portions 312 and 314 extending therefrom. The material of the first connector portion 300 is resilient such that side portions 312 and 314 are held in their illustrated positions, but are both movable toward each other when an external force is applied to them. The side portions 312 and 314 have an inner surface 320 that defines an opening 322 through first connector portion 300 between the side portions 312 and 314. The side portions 312 and 314 extend downwardly to lower ends 316 and 318, respectively. The first end 310 and the side portions 312 and 314 collectively define a U-shaped configuration, similar to a mushroom-like shape, and the first connector portion 300 has a configuration that is generally in the shape of a loop.

In this embodiment, side portion 312 has an outer surface 330 and a projection or ridge 334 extending therefrom. Similarly, side portion 314 has an outer surface 332 and a projection or ridge 336 extending therefrom. The function of projections 334 and 336 is described in greater detail below.

Turning to the second connector portion 500, it has a lower end 510 and a body portion 512. In this embodiment, the body portion 512 is generally circular, and has a configuration that is generally in the shape of a loop. The body portion 512 has angled inner surfaces 520 and 522 that meet at and define a ridge 524 therebetween. The circular shape of body portion 512, as well as the angled inner surfaces 520 and 522 and the ridge 524, help give the second connector portion 500 a greater rigidity than the first connector portion 300. In other words, the force required to deform the first connector portion 300 into a narrower configuration is less than the force required to deform the second connector portion 500 into a narrower configuration. Consequently, when a force is applied to separate connector 200 from an attached first body component (such as the head 130 of toy FIG. 100), the first connector portion 300 will deform before the second connector portion 500 and allow the first body component to be removed without the second connector portion 500 also disengaging from an attached second body component (such as the neck 120 of toy FIG. 100). The angled inner surfaces 520 and 522 and the ridge 524 further collectively define an opening 526 that extends through the body portion 512 of the second connector portion 500. In one embodiment, a second body component (such as the neck or neck portion 120) that is engaged with the second connector portion 500 includes a post or protrusion that extends through the opening 526 to further help retain the second connector portion 500 within the second body component and prevent the second connector portion from being pulled out of the second body component when a first body component is separated or pulled away from the first connector portion 300. The body portion 510 also includes an outer surface 530 that engages with the surfaces that define the hole 128 in the neck 120 of toy FIG. 100.

The intermediate connector portion 400 has a body or middle portion 410 and another body or middle portion 420. The middle portions 410 and 420 are spaced apart from each other by a channel or gap 430, which is defined by the inner surfaces 414 and 424 of middle portions 410 and 420, respectively. The middle portions 410 and 420 also have outer surfaces 412 and 422, respectively. The width of the intermediate connector portion 400 is slightly less than the diameter of the hole 128 in the neck 120 of toy FIG. 100. As a result, the connector 200 can rotate about its longitudinal axis that extends the length of connector 200 through the first connector portion 300, the intermediate connector portion 400, and the second connector portion 500 when the second connector portion 500 is inserted into the cavity 126 of the neck 120.

When the first connector portion 300 is inserted into the mounting hole 134 of body component 130 of toy FIG. 100, forces are applied to the outer surfaces 330 and 332 of side portions 312 and 314, respectively, by the surfaces that define the mounting hole 134. These applied forces are along the direction of arrows "B" in FIG. 6. The side portions 312 and 314 are illustrated in their unbiased or rest positions 313A and 313B, respectively, in FIG. 6. When the forces are applied along the directions of arrows "B", the side portions 312 and 314 move inwardly toward each other (along the directions of arrows "B" as well) to their biased positions 315A and 315B, respectively, which are shown by the dashed lines.

The general spring-like mechanism of the connector 200 allows it to fit a soft body component, such as a rotohead, as well as any form of a 3D printed body component or a body component, such as a head, that is produced from plastic injection, which results in the body component being a hard and non-flexible material.

At the same time, the middle portions 410 and 420 move from their unbiased or rest positions 440 and 442, respectively, toward each other along the directions of arrows "B" to their biased positions 450 and 452, respectively. The channel or gap 430 between middle portions 410 and 420 allows the middle portions 410 and 420 to move toward each other, which facilitates the side portions 312 and 314 of the first connector portion 300 moving toward each other. In the unbiased configuration of the connector 200, the channel or gap 430 has a width or dimension of "D". However, when forces are applied to the connector 200, as described above, the width of the channel or gap 430 is less or smaller than the dimension "D."

When the externally applied forces due to the first connector portion 300 being inserted through the mounting hole 134 are no longer applied to the connector 200, side portions 312 and 314 move back along the directions of arrows "C" to their unbiased positions 313A and 313B, respectively. At the same time, middle portions 410 and 420 move back along the directions of arrows "C" to their unbiased positions 313A and 313B as well.

Figure 7:
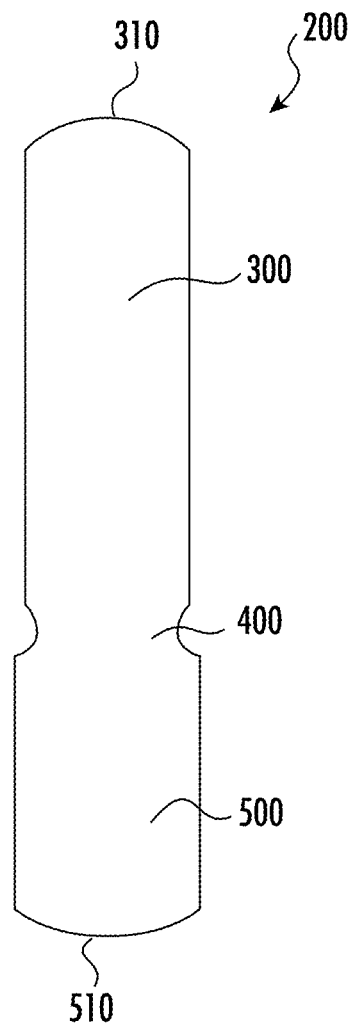
FIG. 7 illustrates a side view of the connector illustrated in FIG. 5.
Figure 8:
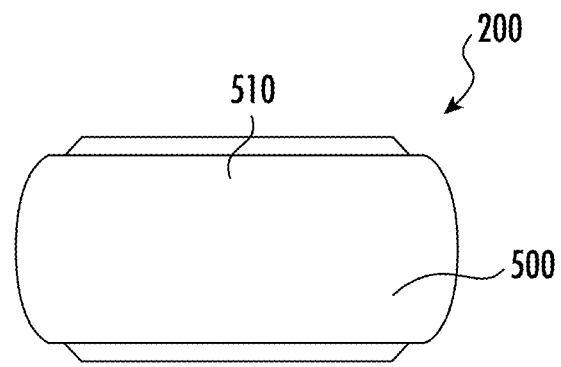
FIG. 8 illustrates a bottom view of the connector illustrated in FIG. 5.
Figure 9:
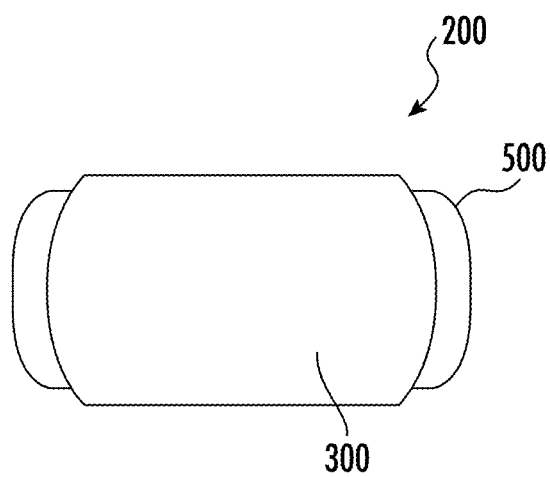
FIG. 9 illustrates a top view of the connector illustrated in FIG. 5.

Turning to FIGS. 7-9, different views of the connector 200 are shown. FIG. 7 is a front view of connector 200 showing the first or upper end 310 of first connector portion 300 and the opposite lower end 510 of second connector portion 500. The width of the first connector portion 300 is less than the width of the second connector portion 500. Moreover, the width of the intermediate connector portion 400 is narrower or less than the widths of the first connector portion 300 and of the second connector portion 500. The narrower width of the intermediate connector portion 400 facilitates the movement of body component 130 relative to body portion 110 when they are coupled by connector 200. In one example, body component 130 is a head for a toy figure, and body portion 110 is a body for a toy figure, and rotation of the head relative to the body is easier with connector 200. In addition, connector 200 provides a sufficiently strong connection between body components 110 and 130, and yet, is flexible enough that a user can remove body component 130 from body portion 110 with the application of a reasonable force.

FIG. 8 is a bottom view of connector 200 showing the bottom end 510 of second connector portion 500. FIG. 9 is a top view of connector 200 showing the first end 310 of first connector portion 300.

Figure 11:
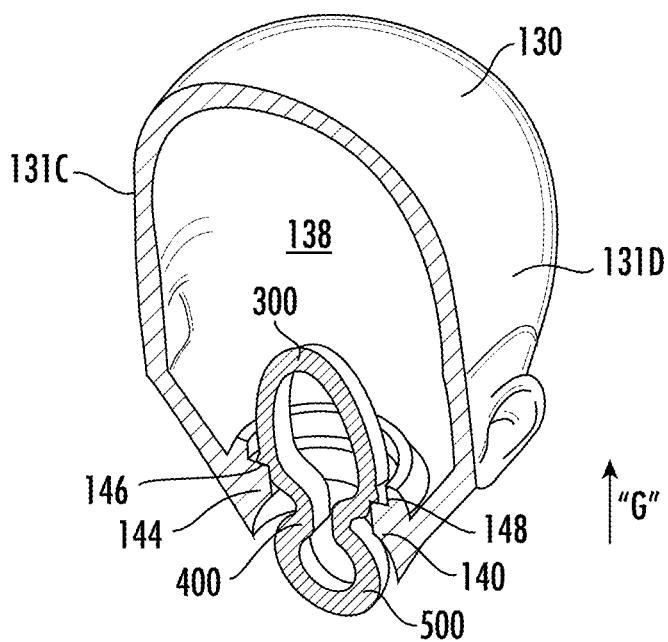
FIG. 11 illustrates a cross-sectional front view of the body component and the connector illustrated in FIG. 10.

Referring to FIGS. 10 and 11, a cross-sectional side view and a cross-sectional front view, respectively, of body component 130 with connector 200 illustrated therein are illustrated. Body component 130 is a head for a toy figure. The body component 130 has a front 131A and an opposite back 131B (see FIG. 10), and a first side 131C and an opposite second side 131D (see FIG. 11). The body component 130 has an inner surface 136 that defines a receptacle or cavity 138 into which part of the connector 200 can be inserted. The body component 130 includes an internal extension or projection 140 that has a tapered surface 142 leading from the outside of the mounting hole 134 inwardly. When the first connector portion 300 is inserted into the mounting hole 134, the outer surfaces 330 and 332 of side portions 312 and 314 engage with the tapered surface 142, which causes the side portions 312 and 314 to start to move toward each other.

The extension 140 also has a ridge 144 that is oriented inwardly and that has an edge 146 and an upper surface 148. As shown in FIG. 10, when first connector portion 300 is inserted into cavity 138, the projections 334 and 336 on first connector portion 300 engage the edge 146 and rest on the upper surface 148. The extension 140 and the ridge 144 extend in a complete circle around the inside of the body component 130, which allows the first connector portion 300 to be able to rotate along them around its longitudinal axis. For example, in FIG. 10, connector 200, with its various connector portions 300, 400, and 500, is oriented in a plane that extends from front 131A to back 131B. In FIG. 11, connector 200 is repositioned and is now oriented in a plane that extends from first side 131C to second side 131D.

The connector 200 is illustrated in FIGS. 10 and 11 in its unbiased configuration. In this configuration, the outer surfaces 330 and 332 have an outer dimension of "F", which is larger than the diameter "E" that is defined by ridge 144. As a result, the first connector portion 300 is retained in the cavity 138 until there is a sufficient external force applied to the connector 200 that pulls it out of the mounting hole 134.

To insert the first connector portion 300 into the body component 130, the connector 200 is moved along the direction of arrow "G" so that the first connector portion 300 engages the tapered surface 142. The gap 430 allows the middle portions of intermediate connector portion 400 to move toward each other, which enables side portions 312 and 314 to move toward each other too. The side portions 312 and 314 move towards each other a sufficient distance so that dimension "F" matches diameter "E" and the first connector portion 300 can move into the cavity 138.

Figure 12:
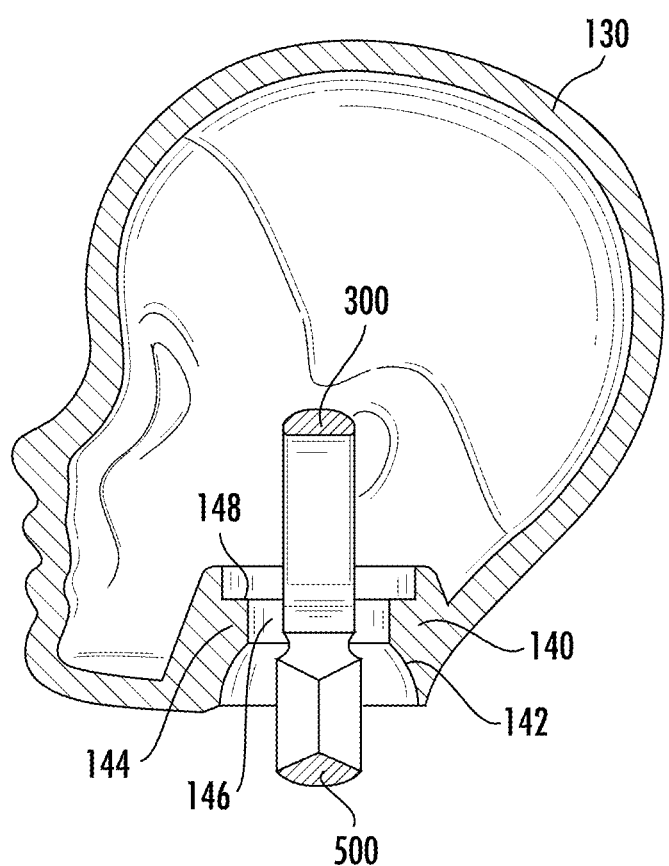
FIG. 12 illustrates a cross-sectional side view of the body component and the connector illustrated in FIG. 10 with the connector in a different orientation.
Figure 13:
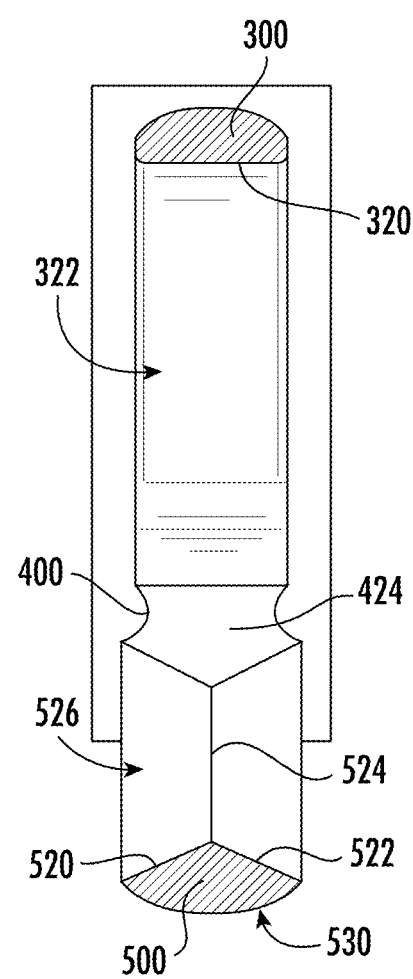
FIG. 13 illustrates a close-up side view of the connector illustrated in FIG. 12.
Figure 14:
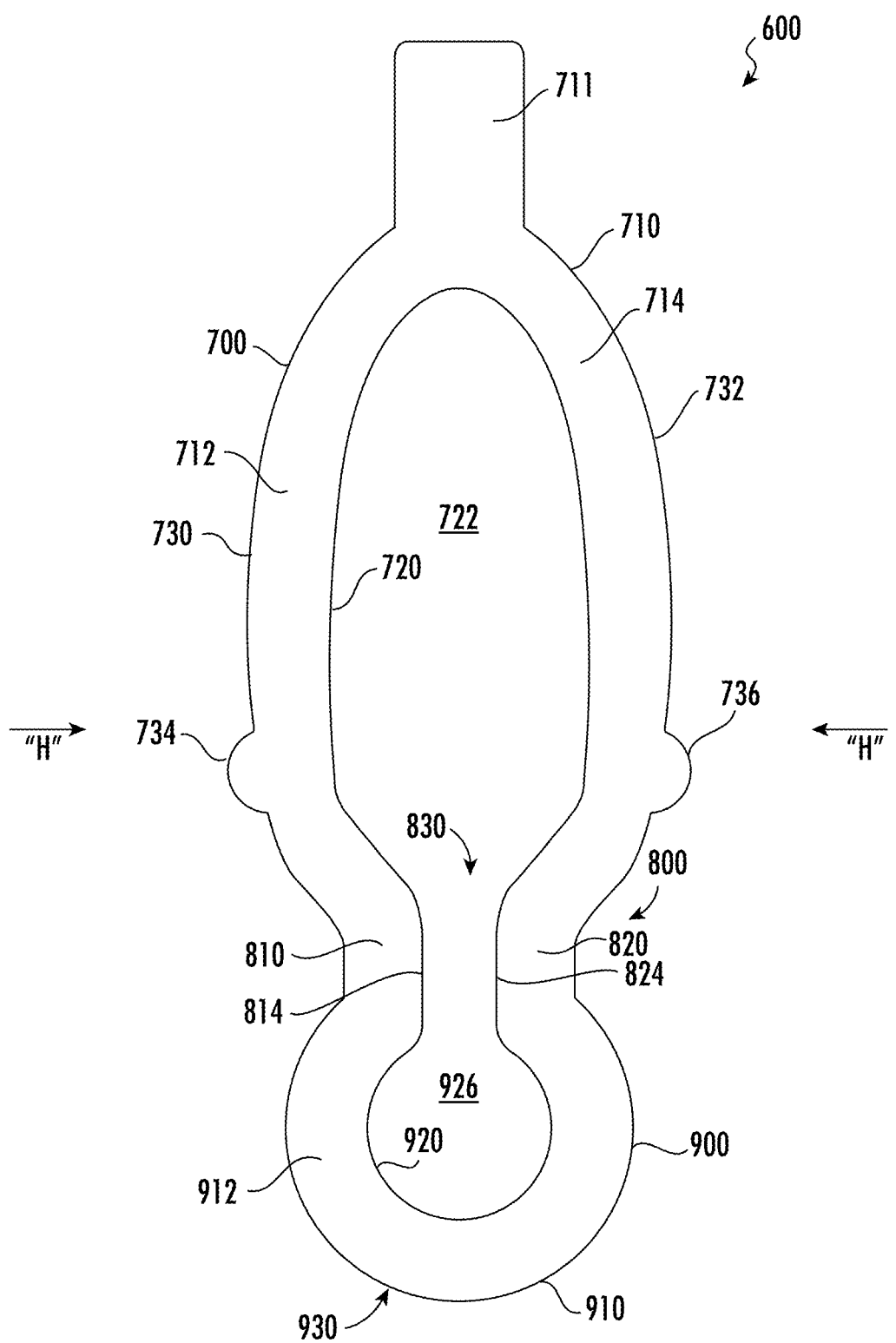
FIG. 14 illustrates a front view of another embodiment of a connector in accordance with the aspects disclosed herein.

Turning to FIGS. 12 and 13, cross-sectional side views of the body component and the connector are illustrated. The various features of the body component 130, including the extension 140, the tapered surface 142, the inner ridge 144, the edge 146, and the upper surface 148, are easily viewable in FIG. 12.

The first connector portion 300 and the second connector portion 500 are shown in both FIGS. 12 and 13. The inner surface 320 of the first connector portion 300 defines through opening 322 as shown. In addition, the angled inner surfaces 520 and 522 along with ridge 524 define through opening 526 for second connector portion 500. The outer surface 530, which is opposite angled inner surfaces 520 and 522 is shown and is generally circular. As for intermediate connector portion 400, one of its inner surfaces 424 is shown as well.

Turning to FIGS. 14-17, an alternative embodiment of a connector is illustrated. Connector 600 has many similar features and components to connector 200, which was previously described. Connector 600 has a first connector portion 700, an intermediate connector portion 800, and a second connector portion 900. The general spring-like mechanism of the connector 600 is similar to that of connector 200, which allows connector 600 to be used with a soft body component and a hard body component.

The first connector portion 700 has an upper end 710 with an extension or post 711 that is oriented away from the rest of the connector 600. First connector portion 700 includes side portions 712 and 714 with outer surfaces 730 and 732 with ridges 734 and 736, respectively. First connector portion 700 also includes an inner surface 720 that defines a through opening 722. Side portions 712 and 714 move toward each other when forces are applied to the first connector portion 700 along the directions of arrows "H."

Intermediate connector portion 800 has body or middle portions 810 and 820 that have inner surfaces 814 and 824, respectively, that have a channel or gap 830 therebetween. The middle portions 810 and 820 move toward each other when the above-referenced forces are applied along the directions of arrows "H."

Second connector portion 900 has a body portion 912 with a lower end 910 that has an outer surface 930. The body portion 912 has an inner surface 920 that defines an opening 926 through the body portion 912. In this embodiment, the inner surface 920 does not have multiple angled inner surfaces like second connector portion 500.

Figures 15, 16, 17:
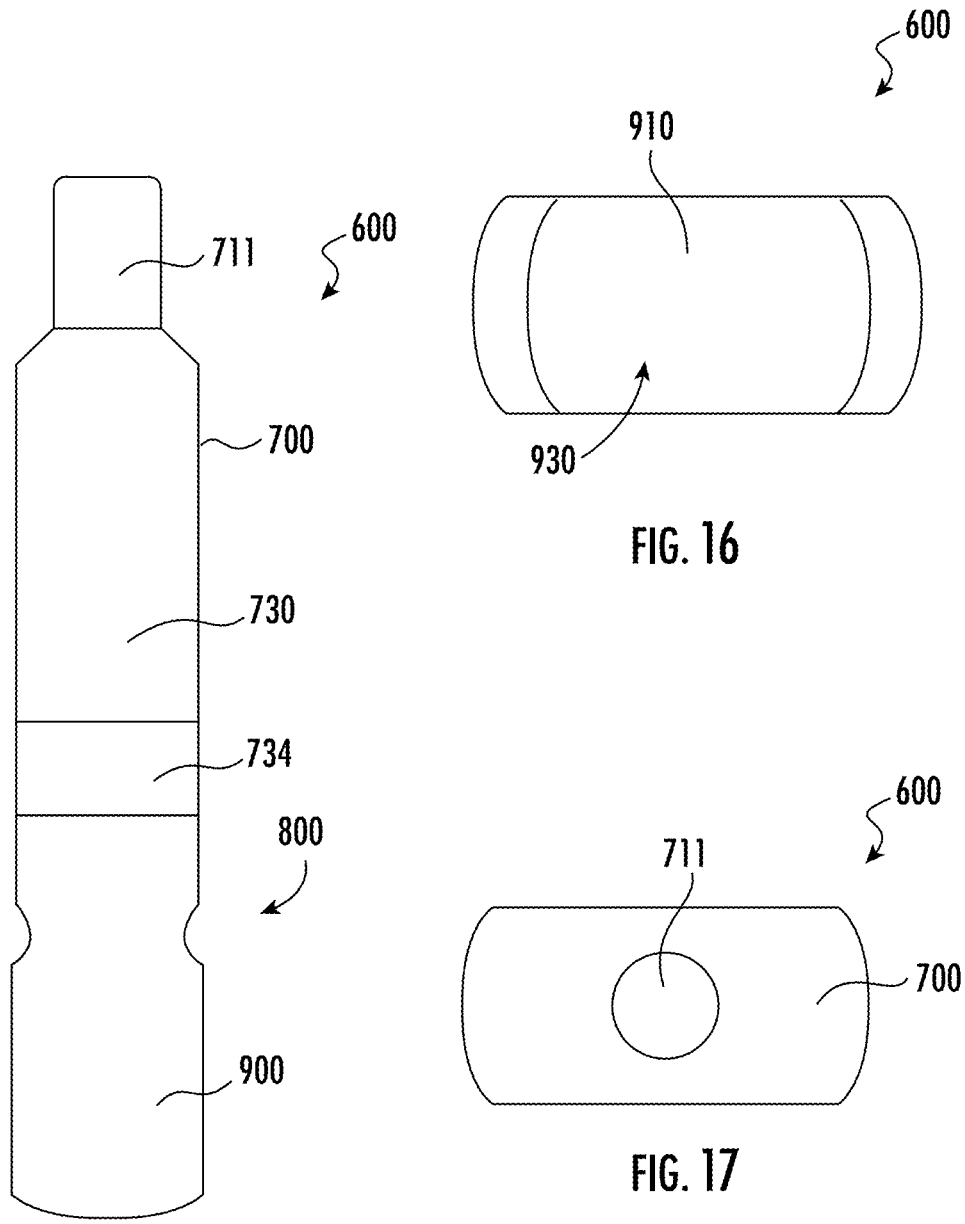
FIG. 15 illustrates a side view of the connector illustrated in FIG. 14.
FIG. 16 illustrates a bottom view of the connector illustrated in FIG. 14.
FIG. 17 illustrates a top view of the connector illustrated in FIG. 14.

FIG. 15 is a side view of connector 600 showing first connector portion 700, second connector portion 900, and intermediate connector portion 800 located therebetween. In this embodiment, the widths of first connector portion 700 and second connector portion 900 are substantially the same. The extension or post 711 is shown extending upwardly from first connector portion 700. Also shown are outer surface 730 with ridge 734.

FIG. 16 is a bottom view of connector 600 showing lower end 910 with outer surface 930. FIG. 17 is a top view of connector 600 showing first connector portion 700 with post 711.

Figure 18:
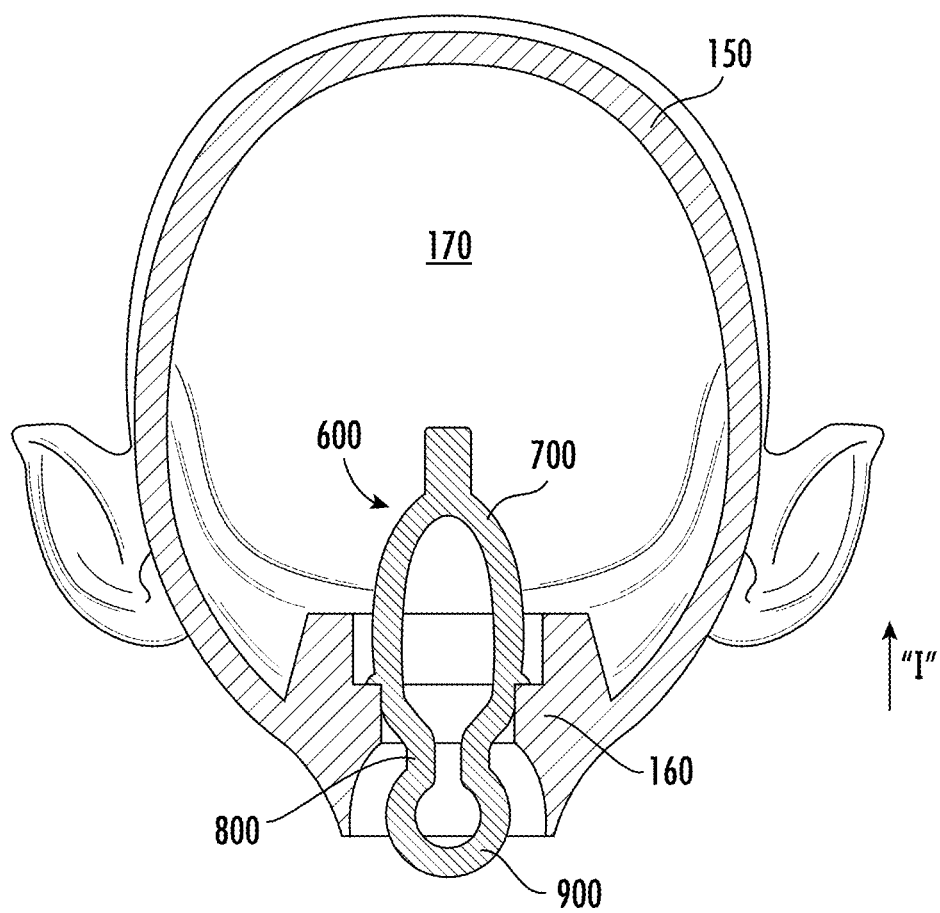
FIG. 18 illustrates a cross-sectional front view of an alternative embodiment of a body component and the connector illustrated in FIG. 14.

Referring to FIG. 18, a cross-sectional front view of an alternative embodiment of a body component is illustrated. In this embodiment, the body component 150 defines a receptacle or cavity 170 into which part of connector 600 can be inserted. The various parts of connector 600, including first connector portion 700, intermediate connector portion 800, and second connector portion 900 are shown. First connector portion 700 has been inserted into cavity 170 along the direction of arrow "I". Once the first connector portion 700 has been inserted, it engages with extension 160 as shown.

While the toy figures presented herein have been illustrated and described in detail and with reference to specific embodiments thereof, it is nevertheless not intended to be limited to the details shown, since it will be apparent that various modifications and structural changes may be made therein without departing from the scope of the disclosure and within the scope and range of equivalents of the claims. In addition, various features from one of the embodiments may be incorporated into another of the embodiments. That is, it is believed that the disclosure set forth above encompasses multiple distinct embodiments with independent utility. While each of these embodiments has been disclosed in a preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Accordingly, it is appropriate that the appended claims be construed broadly and in a manner consistent with the scope of the disclosure as set forth in the following claims.

It is also to be understood that the toy figures and connectors described herein, or portions thereof may be fabricated from any suitable material or combination of materials, such as plastic, foamed plastic, wood, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Additionally, it is to be understood that terms such as "first," "second," "left," "right," "top," "bottom," "front," "rear," "side," "height," "length," "width," "upper," "lower," "interior," "exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the disclosure.

Moreover, when used herein, the term "comprises" and its derivations (such as "comprising," "includes," "including," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". For example, the term "approximately" can denote a tolerance of plus or minus 0.002 inches, 0.001 inches, or up to 0.005 inches. The same applies to the terms "about" and "around" and "substantially." Moreover, for the purposes of the present disclosure, the phrase "A and/or B" means (A), (B), or (A and B), and the phrase "A, B, and/or C" means (A), (B), (C), (A and B), (A and C), (B and C), or (A, B and C).

What is claimed is:

1. A toy figure, comprising:
a first body component defining a first cavity and a first hole;
a second body component defining a second cavity and a second hole; and
a connector that couples the first body component to the second body component, the connector including:
a first connector portion engageable with the first body component and insertable into the first hole and first cavity, the first connector portion defining a first opening therethrough, the first connector portion including a first side portion and a second side portion, the first side portion and the second side portion moving toward each other as the first connector portion is being inserted into the first hole and away from each other after the first connector portion has been inserted into the first cavity;
a second connector portion engageable with the second body component and insertable into the second hole and second cavity, the second connector portion defining a second opening therethrough; and
an intermediate connector portion located between and coupled to the first connector portion and the second connector portion, the intermediate connector portion including a first middle portion and a second middle portion that define a channel therebetween, the channel being in communication with the first opening and the second opening, wherein the first middle portion and the second middle portion are movable toward and away from each other.

2. The toy figure of claim 1, wherein the first side portion includes a first outer surface, the second side portion includes a second outer surface, and the first opening is located between the first side portion and the second side portion.

3. The toy figure of claim 2, wherein the first outer surface has a first projection extending therefrom, and the first projection engages the first body component when the first connector portion is inserted into the first cavity.

4. The toy figure of claim 3, wherein the second outer surface has a second projection extending therefrom in a direction opposite the first projection, and the second projection engages the first body component when the first connector portion is inserted into the first cavity.

5. The toy figure of claim 2, wherein the first hole has a diameter that is a first distance, the first outer surface and the second outer surface are separated by a second distance, the second distance between greater than the first distance, and forces are applied to the first side portion and to the second side portion as the first connector portion is inserted into the first hole.

6. The toy figure of claim 5, wherein the forces cause the first side portion and the second side portion to move toward each other, and cause the first middle portion and the second middle portion to move toward each other.

7. The toy figure of claim 6, wherein, when the first middle portion and the second middle portion move toward each other, a width of the channel decreases.

8. The toy figure of claim 7, wherein the first body component includes an internal projection that extends into the first cavity and defines in part the first hole, and the internal projection includes a ridge extending inwardly therefrom.

9. The toy figure of claim 8, wherein the ridge applies the forces on the first side portion and the second side portion as the first side portion and the second side portion engage the ridge.

10. The toy figure of claim 9, wherein, when the first connector portion moves past the ridge and into the first cavity, the first side portion and the second side portion move away from each other, and the first middle portion and the second middle portion move away from each other.

11. The toy figure of claim 1, wherein the first connector portion has a first loop configuration defining the first opening, the second connector portion has a second loop configuration defining the second opening, and the first loop configuration is larger than the second loop configuration.

12. A toy figure, comprising:
a first body component having a cavity;
a second body component; and
a connector that couples the first body component to the second body component, the connector being separate from and insertable into each of the first body component and the second body component, the connector including:
a first connector portion that engages the first body component, the first connector portion having a first side portion and a second side portion, the first side portion and second side portion being movable toward and away from each other;
a second connector portion that engages with the second body component; and
an intermediate connector portion coupled to the first connector portion and the second connector portion, the intermediate connector portion including a first middle portion and a second middle portion spaced apart from the first middle portion, wherein the first middle portion and the second middle portion are movable toward each other as the first connector portion is inserted into the cavity and movable away from each other when the first connector portion is located in the cavity.

13. The toy figure of claim 12, wherein the first side portion has a first outer surface with a first projection extending therefrom, the second side portion has a second outer surface with a second projection extending therefrom, and each of the first projection and the second projection engages the first body component when the first connector portion is inserted into the cavity.

14. The toy figure of claim 13, wherein the first body component applies forces to both the first side portion and the second side portion as the first connector portion is inserted into the cavity, and the forces cause the first middle portion and the second middle portion to move toward each other.

15. The toy figure of claim 14, wherein the first body component includes an internal projection that extends into the cavity and defines a hole, the internal projection includes a ridge, the ridge applies the forces on the first side portion and the second side portion as the first side portion and the second side portion engage the ridge, and the first middle portion and the second middle portion move away from each other after the first side portion and the second side portion move past the ridge and into the cavity.

16. A toy figure, comprising:
a first body component having a cavity;
a second body component; and
a connector that couples the first body component to the second body component, the connector being separable from and insertable into each of the first body component and the second body component, the connector including:
- a first connector portion that engages the first body component, the first connector portion having a first side portion and a second side portion, each of the first side portion and second side portion is movable toward each other from a first unbiased position to a first biased position as the first connector portion is inserted into the cavity and movable away from each other from a first biased position to a first unbiased position after the first connector portion has been inserted into the cavity;
- a second connector portion that engages with the second body component; and
- an intermediate connector portion coupled to the first connector portion and the second connector portion, the intermediate connector portion including a first middle portion and a second middle portion spaced apart from the first middle portion, wherein each of the first middle portion and the second middle portion is movable toward each other from a second unbiased position to a second biased position as the first connector portion is inserted into the cavity.

17. The toy figure of claim 16, wherein the first middle portion and the second middle portion move away from each other from their second biased positions to their second unbiased positions after the first connector portion has been inserted into the cavity.

18. The toy figure of claim 16, wherein the first side portion has a first outer surface with a first projection extending therefrom, the second side portion has a second outer surface with a second projection extending therefrom, and each of the first projection and the second projection engages the first body component when the first connector portion is located in the cavity.

19. The toy figure of claim 18, wherein the first body component applies forces to both the first side portion and the second side portion as the first connector portion is inserted into the cavity, and the forces cause the first middle portion and the second middle portion to move toward each other.

* * * * *